(12) United States Patent
Tobias

(10) Patent No.: US 8,547,380 B2
(45) Date of Patent: Oct. 1, 2013

(54) PERSISTENT, IMMERSIBLE AND EXTRACTABLE AVATARS

(75) Inventor: Richard Lynn Tobias, Salem, OR (US)

(73) Assignee: Elite Avatars, LLC, Salem, OR (US)

( * ) Notice: Subject to any disclaimer, the term of this patent is extended or adjusted under 35 U.S.C. 154(b) by 925 days.

(21) Appl. No.: 12/690,032

(22) Filed: Jan. 19, 2010

(65) Prior Publication Data

US 2010/0122267 A1    May 13, 2010

Related U.S. Application Data

(63) Continuation-in-part of application No. 10/913,837, filed on Aug. 5, 2004, now Pat. No. 7,675,519.

(51) Int. Cl.
*G06T 13/00* (2011.01)
*G06F 3/048* (2013.01)

(52) U.S. Cl.
USPC ............................... 345/473; 715/706

(58) Field of Classification Search
USPC .......................... 345/473; 715/706
See application file for complete search history.

(56) References Cited

U.S. PATENT DOCUMENTS

| | | | |
|---|---|---|---|
| 4,378,118 A | 3/1983 | Leonardi | |
| 5,261,041 A | 11/1993 | Susman | |
| 5,485,600 A | 1/1996 | Joseph et al. | |
| 5,498,003 A | 3/1996 | Gechter | |
| 5,872,973 A | 2/1999 | Mitchell | |
| 5,884,029 A | 3/1999 | Brush, II et al. | |
| 5,956,038 A | 9/1999 | Rekimoto | |
| 6,009,458 A | 12/1999 | Hawkins et al. | |
| 6,009,460 A | 12/1999 | Ohno et al. | |
| 6,024,643 A | 2/2000 | Begis | |
| 6,117,011 A | 9/2000 | Lvov | |
| 6,119,229 A | 9/2000 | Martinez et al. | |
| 6,141,019 A | 10/2000 | Roseborough et al. | |
| 6,267,672 B1 | 7/2001 | Vance | |
| 6,279,112 B1 | 8/2001 | O'Toole, Jr. et al. | |
| 6,419,577 B1 | 7/2002 | Okada et al. | |
| 6,428,414 B1 | 8/2002 | Shimomura et al. | |
| 6,476,830 B1 | 11/2002 | Farmer et al. | |
| 6,545,682 B1 | 4/2003 | Ventrella et al. | |
| 6,563,503 B1 | 5/2003 | Comair | |

(Continued)

FOREIGN PATENT DOCUMENTS

| JP | 2002-207685 | 7/2002 |
|---|---|---|
| JP | 2002360936 | 12/2002 |
| WO | WO03005818 | 7/2003 |
| WO | WO03058518 | 7/2003 |

OTHER PUBLICATIONS

Official Guide Book for Genso Suiko-den III, 1st Edition, p. 26, published by Konami Corporation on Sep. 20, 2002.

(Continued)

*Primary Examiner* — Jeffrey Chow
(74) *Attorney, Agent, or Firm* — Marger Johnson & McCollom PC

(57) ABSTRACT

Avatar data is stored in a management application. The management application sends an immersion request to the application. The management application identifies the avatar data fields used by the application, and any appropriate scaling and avatar transformation. The management application scales the data appropriately, transforms the avatar if necessary, and transmits the (scaled and transformed) avatar data to the application. When the avatar is to be removed from the application, the application transmits the avatar data back to the management application, which integrates any changes to the avatar data into the original avatar data.

26 Claims, 6 Drawing Sheets

(56) References Cited

U.S. PATENT DOCUMENTS

| | | |
|---|---|---|
| 6,591,250 B1 | 7/2003 | Johnson et al. |
| 6,692,359 B1 | 2/2004 | Williams et al. |
| 6,745,236 B1 | 6/2004 | Hawkins et al. |
| 6,821,205 B2 | 11/2004 | Takahashi et al. |
| 6,884,175 B2 | 4/2005 | Toriyama et al. |
| 7,025,675 B2 | 4/2006 | Fogel et al. |
| 7,143,358 B1 | 11/2006 | Yuen |
| 7,249,139 B2 | 7/2007 | Chuah et al. |
| 7,275,987 B2 | 10/2007 | Shimakawa et al. |
| 2002/0022516 A1 | 2/2002 | Forden |
| 2003/0004774 A1 | 1/2003 | Greene et al. |
| 2003/0115063 A1 | 6/2003 | Okunoki |
| 2003/0156134 A1 | 8/2003 | Kim |
| 2004/0053690 A1 | 3/2004 | Fogel et al. |
| 2004/0224739 A1 | 11/2004 | Yamada et al. |
| 2005/0137015 A1 | 6/2005 | Rogers et al. |
| 2005/0143174 A1 | 6/2005 | Goldman et al. |
| 2005/0182693 A1 | 8/2005 | Alivandi |
| 2005/0203922 A1 | 9/2005 | Uhlir et al. |
| 2005/0206610 A1 | 9/2005 | Cordelli |
| 2006/0166593 A1 | 7/2006 | Shrock et al. |
| 2007/0159499 A1 | 7/2007 | Sinclair et al. |

OTHER PUBLICATIONS

Black Isle Studios, "Baldurs Gate II—Shadow of Amn User Manual", Sep. 26, 2000.
BTexact Technology, "Avatar CRM Solution", Jul. 1, 2003.
Sproull et al., "Making Information Cities Livable", Communication of the ACM, vol. 47, No. 2, Feb. 2004, pp. 33-37.
Churchill et al., "Blending Digital and Physical Spaces for Ubiquitous Community Participation", Communication of the ACM, vol. 47, No. 2, Feb. 2004, pp. 39-44.
Ferguson et al., "Open Frameworks for Information Cities", Communication of the ACM, vol. 47, No. 2, Feb. 2004, pp. 45-49.
Sairamesh et al., "Information Cities", Communication of the ACM, vol. 47, No. 2, Feb. 2004, pp. 29-31.
Wikipedia, "Asheron's Call", retrieved from http://en.wikipedia.org/wiki/Asheron%27s_Call, Jul. 10, 2008, pp. 1-9.

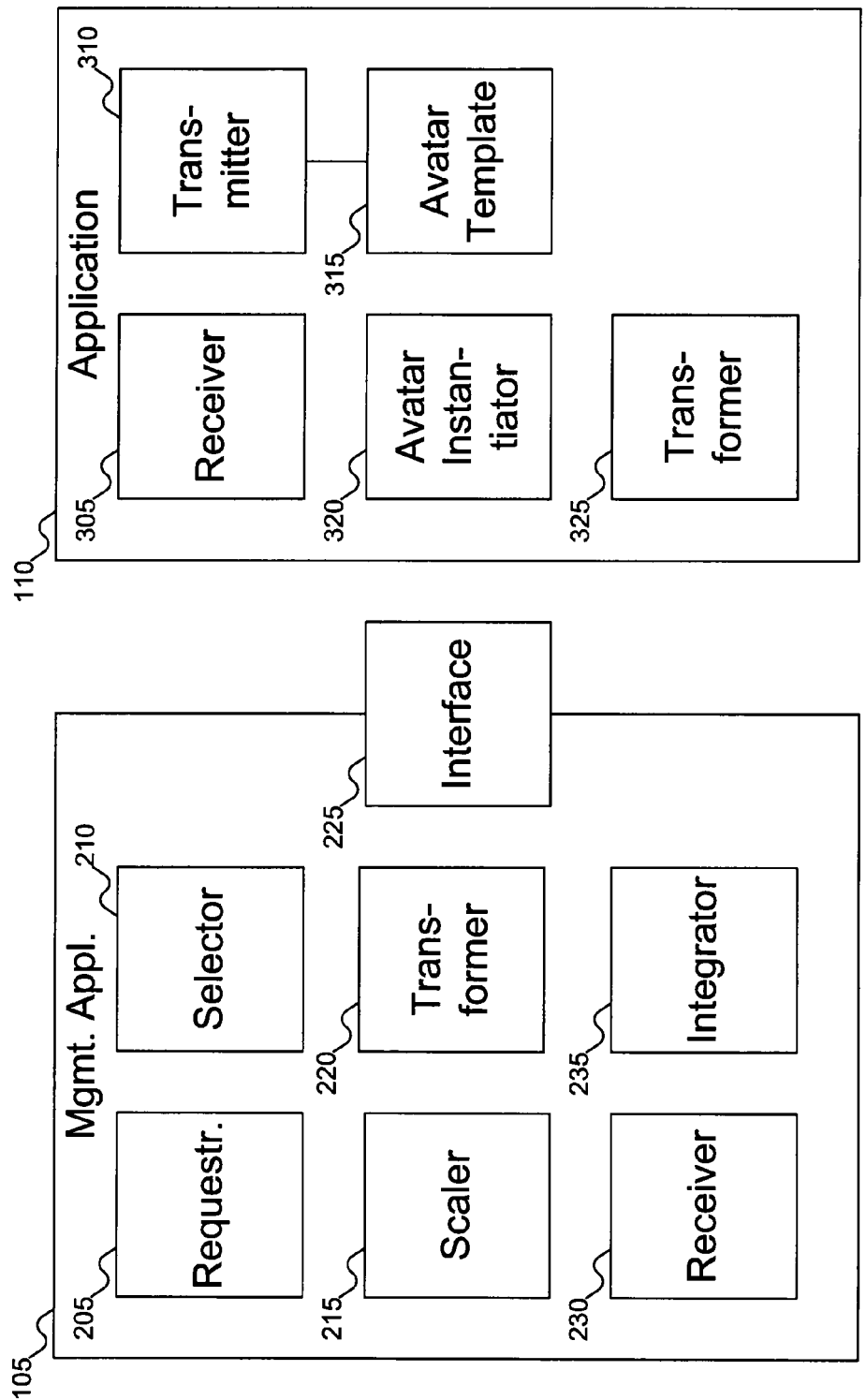

PERSISTENT, IMMERSIBLE AND EXTRACTABLE AVATARS

RELATED APPLICATION DATA

This patent application is a continuation-in-part of U.S. patent application Ser. No. 10/913,837, filed Aug. 5, 2004, now U.S. Pat. No. 7,675,519, issued Mar. 9, 2010.

FIELD

This invention pertains to avatars, and more particularly to avatars that can be used in computers with multiple applications.

BACKGROUND

Webster's Third New International Dictionary (unabridged) defines "avatar" as "the descent and incarnation of a deity in earthly form; . . . an incarnation or embodiment in human form; . . . a remarkably complete manifestation or embodiment usu[ally] in a person, of a concept, philosophy, or tradition; . . . a variant phase or version of a continuing basic entity sometimes implying no more than a change in name . . . " (WEBSTER'S THIRD NEW INTERNATIONAL DICTIONARY 150 (2002)). As the term is used in the computer arts, the intended meaning lies somewhere in between these definitions, perhaps best described as a representation of the person in an application.

In terms of use, avatars in the computer arts (hereafter described simply as avatars) find their most prominent use in computer games, although other uses exist. Games such as Asheron's Call (a registered trademark of Turbine Entertainment Software Corporation) allow many different players to meet online and play cooperatively (or not). Each player assembles a representation of herself, selecting a character type, a preferred graphical representation for the player, and equipping the graphical representation with information and supplies. This graphical representation, acting in the player's stead, is an example of an avatar.

But avatars as used today are limited to individual environments. A player cannot take her avatar from Asheron's Call and insert that avatar in a different game (except possibly for successor games by Turbine Entertainment). Thus, if the player wants to play a different game, she must create a different avatar for the different game. This required replication means that the effort put into creating one avatar is of no advantage for creating an avatar in a different environment. Worse, there is no way to carry over any of the details of the avatar from one game to another, which means that any time spent developing the character beyond its creation must also be reproduced.

Embodiments of the invention address these problems and others in the art.

BRIEF DESCRIPTION OF THE DRAWINGS

FIG. 2 shows details of the management application of FIG. 1, according to embodiments of the invention.

FIG. 3 shows details of one of the applications of FIG. 1, according to embodiments of the invention.

DETAILED DESCRIPTION OF THE PREFERRED EMBODIMENT

Figure 1:
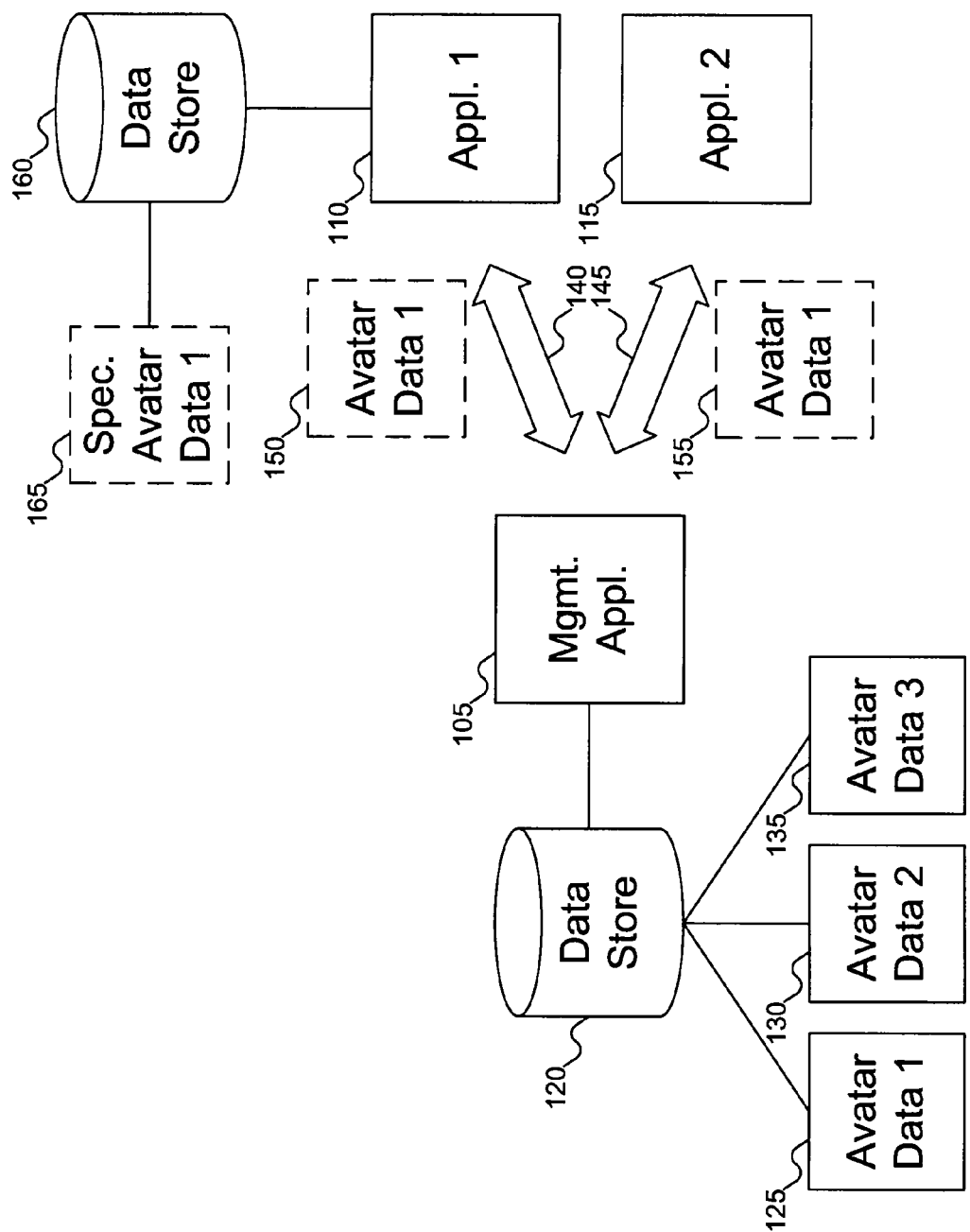
FIG. 1 shows a management application interfacing with multiple applications to instantiate avatars in the multiple applications, according to an embodiment of the invention.

FIG. 1 shows a management application interfacing with other applications to instantiate avatars in the multiple applications, according to an embodiment of the invention. In FIG. 1, management application 105 is responsible for managing the avatars and their insertion (or immersion) into various applications, such as applications 110 and 115. Although FIG. 1 shows only two applications, a person skilled in the art will recognize that there can be any number of applications into which an avatar can be inserted.

To store the avatars, management application 105 includes data store 120. In FIG. 1, data store 120 is shown as storing three avatar data 125, 130, and 135, but a person skilled in the art will recognize that data store 120 can store any number of avatar data.

When an avatar is to be immersed in an application, the application does not need to store data for the avatar: the application receives the data from management application 105. Management application 105 communicates with the application, determining what data the application needs. Then, management application 105 transmits the data to the application, enabling the avatar to interact with the application. For example, FIG. 1 shows management application 105 communicating with applications 110 and 115 using communication lines 140 and 145, respectively.

Communication lines 140 and 145 can be any desired lines of communication, including networks such as Local Area Networks (LANs), Wide Area Networks (WANs), or the Internet. Hardware can include wired networks such as Megabit or Gigabit Ethernet, or wireless networks such as any of the IEEE 802.11 wireless network standards or a Bluetooth network. The networks can use an infrastructure or can be ad hoc. Any desired protocols can be used to transmit data over the communication lines, such as the Transmission Control Protocol/Internet Protocol (TCP/IP) or the User Datagram Protocol (UDP).

While FIG. 1 shows management application 105 transmitting two copies of avatar data 125 (shown as copies 150 and 155) to applications 1 and 2 (numbered 110 and 115), a person skilled in the art will recognize that generally an avatar is immersed in only one application. Immersing an avatar in more than one application at a time can result in the avatar gaining experience in one application that is inconsistent with the experience of the avatar in the other application. But if management application 105 has the ability to integrate avatar data coming from two different applications and to resolve potential experience contradictions, then management application 105 can immerse the same avatar in multiple applications simultaneously. In addition, as shown below, there are situations in which is advantageous for an avatar to be immersed in multiple applications simultaneously.

Ideally, management application 105 would be responsible for storing all data relating to every avatar. But in practice, it can happen that some applications use avatar data that are specific to the application, and not needed by any other application. While management application 105 can be responsible for storing this data, an alternative is to make the application responsible for storing avatar data specific to that application. As shown in FIG. 1, application 110 includes data store 160, which is shown storing avatar data 165 specific to application 110. When avatar data 150 is transmitted to application 110, application 110 integrates application data 150 with application-specific data 165 before the avatar begins interacting with the application.

After the avatar is finished using the application, the application can then return the avatar data to management application 105 using communication lines 150 and 155. The application can return all of the data to management application 105, even data generated by the application that was not in the data provided by management application 105 (provided the data is data that would be used by other applications in immersing the avatar). The application can also store application-specific data in its data store.

For avatars to be immersible in multiple applications as shown requires an agreement on the standards for avatar immersion. In one embodiment of the invention, standards are set by a certifying organization. This certifying organization can be responsible for defining how avatars are stored by management application 105, what types of data can be stored by management application 105, how the messages passed between management application 105 and the applications are structured and transmitted, etc. Then, to support immersible avatars, each application has to conform to the standards: that is, the application has to be certified by the certifying organization.

Another function that can be performed by the certifying organization is determining the appropriate scales for each application. As will be discussed below with reference to FIGS. 2 and 4, one function performed by management application 105 is to scale the avatar data before transmitting it to the application. Different applications can be easier or harder than others in terms of the effort required to gain experience and to develop the avatar. To account for these differences in internal difficulty level, the standard-setting or certifying organization can review each application, and as part of the process of qualifying the application to use immersible avatars can determine where the application fits on a scale relative to one used by management application 105. A person skilled in the art will recognize that more than one scale might be appropriate, depending on the application. For example, an application might be more difficult with respect to one avatar attribute, but easier with respect to another.

As an example of how the certifying organization could operate, consider avatars in multi-player gaming environments. One gaming application might be set in an environment that uses a bow and arrow, provided the avatar takes a "course" in archery. Another such gaming application might instead use a more "modern" weapon, such as a rifle. Learning to use a bow and arrow is a more difficult skill than learning to use a rifle, but the tools themselves are essentially interchangeable. Thus, rather than having management application 105 store information separately for each skill and tool, as avatars progress through learning the skills, management application 105 can store scaled data representing the effort expended. And if two avatars using the different gaming applications exert the same amount of effort to learn the respective skills, the avatar learning to use the bow and arrow will be scaled more highly than the avatar learning to use the rifle. Then, if the avatar learning to use the bow and arrow switches to the gaming application with the rifle, the experience level will be scaled to a lower level, reflecting the difference in difficult levels of the skills.

To help explain this more clearly, assume that the skills have different levels of mastery, such as novice proficiency, intermediate proficiency, and expert proficiency. Further, assume that achieving each level of mastery for the bow and arrow requires six units of effort, and each level of mastery for the rifle requires four units of effort. If a player has completed three of the four units in attaining novice proficiency with a rifle, that would be analogous to having learned roughly four of the six units toward attaining novice proficiency with a bow and arrow. Thus, while only one unit would remain unlearned with the rifle, two would remain unlearned for the bow and arrow. Going in the other direction, if a player had expended three of the six units toward attaining novice proficiency with a bow and arrow and then switched to the other gaming application, only two units would remain to learning how to use a rifle.

Because users can (usually) remove avatars from the environments at any time, the avatar data would store data relating to the effort expended in learning the skill. Thus, if the avatar is removed from the bow and arrow environment after reaching an intermediate proficiency, that would be represented by 12 units of effort. When the avatar is immersed in the rifle environment, 12 units of effort would represent expert proficiency, meaning that the avatar might have better aim, or be faster in reloading the rifle.

Although learned skills such as using bows and arrows or rifles are one type of data that can be scaled, a person skilled in the art will recognize that any data in the avatar data can be scaled. For example, physical, mental, emotional, educational, and other attributes of the avatar can be stored and scaled. As a more specific example, some avatars might include attributes such as intelligence, charisma, strength, wisdom, etc.: attributes that are intangible and, to some extent, difficult to change once set.

Although applications can use the same avatar data, if the fields used by the applications are only relatively compatible, scaling might not be all that is needed to make the avatar fit the application. For example, the graphic representation of an avatar within an application might vary, depending on the particular application: one gaming application might use avatars that are chosen from human ethnic groups, whereas another gaming application might use offer avatar representations based on alien species, but without ethnic subcategories. For example, a Star Trek® environment might offer human, Klingon®, Romulan®, and other alien species for the avatars. (Star Trek, Klingon, and Romulan are registered trademarks of Paramount Pictures Corporation.) Thus, as part of immersing an avatar into an application, the data might need to be transformed to a form appropriate to the application. This transformation can be done automatically (if an appropriate mapping can be easily determined), or can be done manually by letting the user select the desired transformation. The transformation can also be done either by management application 105, or by the application into which the avatar is being immersed. If management application 105 performs the transformation, then the various applications are saved the individual burdens of performing transformations. But if the individual applications perform the transformations, they can potentially customize how the transformations occur to their best advantage.

As part of being certified, it is not required that an application use all possible data fields. For example, an application might permit an avatar to gain experience and to interact with objects, but not to actually carry any objects. This application can be certified without needing management application 105 to provide carried objects as part of immersing the avatar into the application.

FIG. 2 shows details of the management application of FIG. 1, according to embodiments of the invention. In FIG. 2, management application 105 is shown as including several components. Requester 205 is used to request the data fields and the scaling of those fields the application uses, which store avatar data, for the immersion. Normally, management application 105 requests this information from the application as part of the request to immerse the avatar, but a person skilled in the art will recognize that this information can be request from a third-party entity: e.g., the certifying organization. Selector 210 selects from the data store (shown in FIG. 1) data that correspond to the fields used by the application. Scaler 215 is responsible for scaling the data to an appropriate level for the application, for reasons like those discussed above. Transformer 220 is responsible for transforming the data to a form appropriate for the application, as discussed above. Interface 225 is used to communicate with the application (that is, to transmit the information from requester 205, and to transmit the avatar after it has been scaled and transformed by scaler 215 and transformer 220, respectively.)

Receiver 230 receives data from the application about the avatar, after the avatar has finished interacting with the application. (Again, interface 225 is used in this communication.) Integrator 235 is responsible for integrating the data back into the data store, as some of the data might have changed while the avatar was immersed. Note that management application 105 should not delete the avatar data while the avatar is immersed, because the application might not need (or even be able to use) all of the avatar data. Thus, integrator 235 merges the received avatar data back into the original data still in the data store.

FIG. 3 shows details of one of the applications of FIG. 1, according to embodiments of the invention. Application 110 is shown as including receiver 305, used to receive a request to immerse an avatar into the application. Transmitter 310 responds, specifying the data fields used by application 110 for avatars. (Transmitter 310 can also be used to transmit the avatar data back to the management application, after the avatar is removed from application 110.) Application 110 can use avatar template 315 to store the data fields application 110 uses. Avatar instantiator 320 is responsible for taking the avatar data received from the management application, using that data to fill the data fields for a new avatar, and instantiate the avatar into the application. Finally, application 110 can include transformer 325, which performs the transformation described above.

Figure 4:
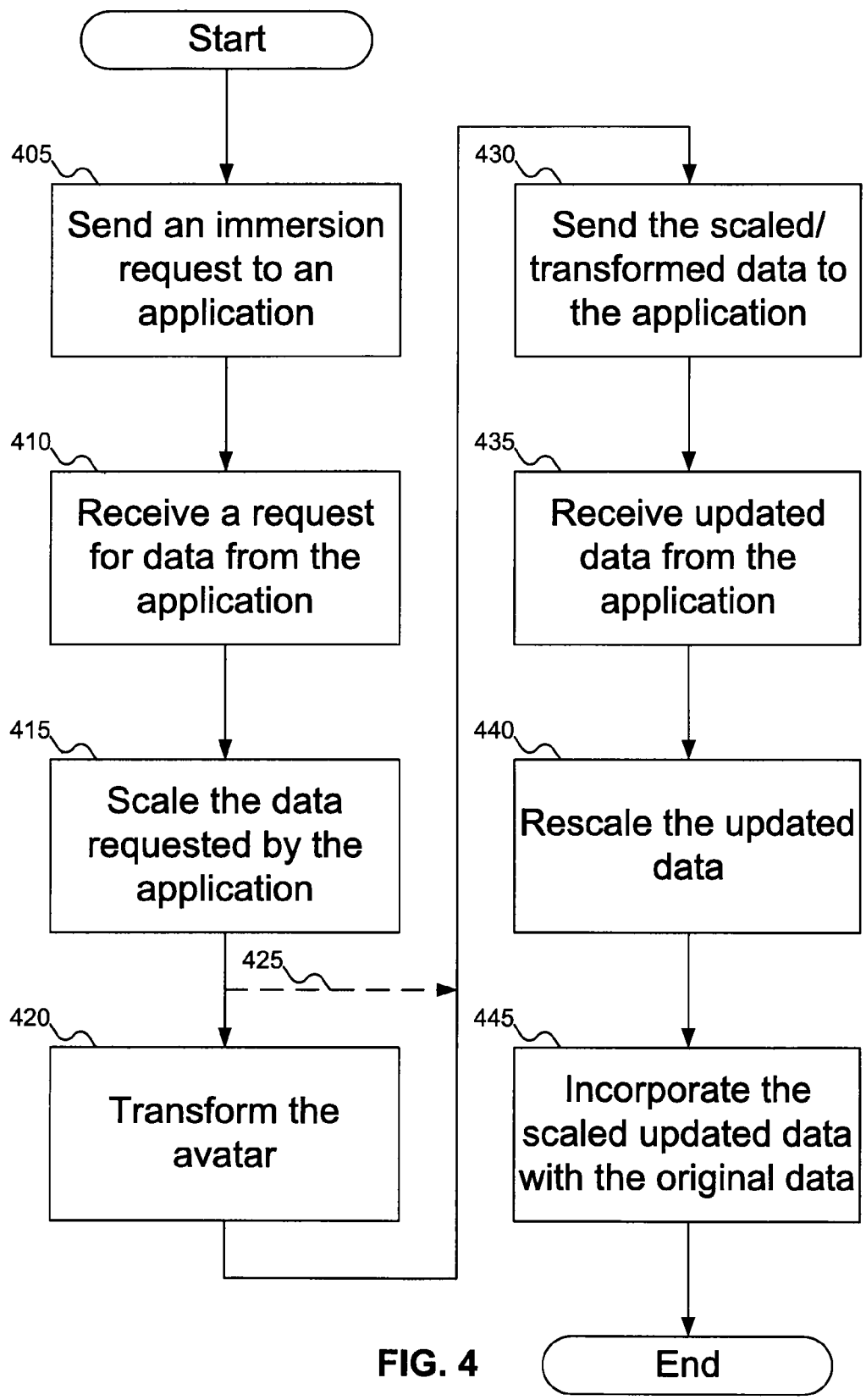
FIG. 4 shows a procedure for using a management application to insert an avatar in an application in the system of FIG. 1, according to an embodiment of the invention.

FIG. 4 shows a procedure for using a management application to insert an avatar in an application in the system of FIG. 1, according to an embodiment of the invention. In FIG. 4, at step 405, the management application sends a request to immerse an avatar in an application. At step 410, the management application receives the data fields and their scaling used by the application. As discussed above with reference to FIG. 2, the management application normally receives the data fields, along with their scaling, from the application, but can alternatively receive this information from a third-party entity, such as the certifying organization. At step 415, the management application scales the data requested by the application. At step 420, the management application transforms the avatar to a form acceptable to the application. As discussed above, the management application does not need to carry out the transformation, in which case step 420 can be omitted, as shown by arrow 425.

At step 430, the scaled and transformed data is sent to the application. At step 435, the management application receives updated avatar data from the application. At step 440, the management application rescales the updated data, and at step 445, the management application incorporates the scaled, updated data into the original data.

Figure 5A:
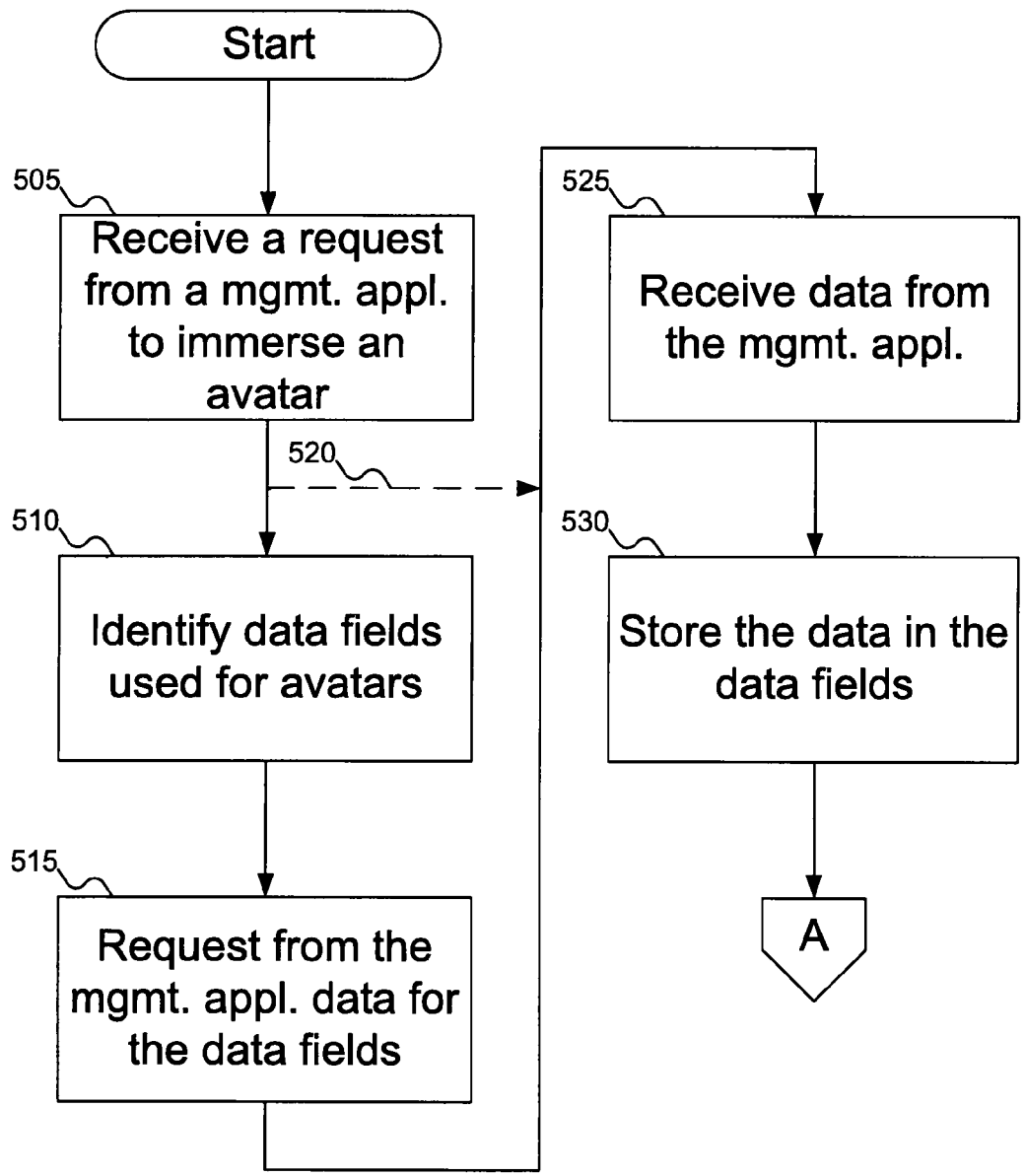
FIGS. 5A-5C show a procedure for using an application to instantiate an avatar received from a management application in the system of FIG. 1, according to an embodiment of the invention.
Figure 5B:
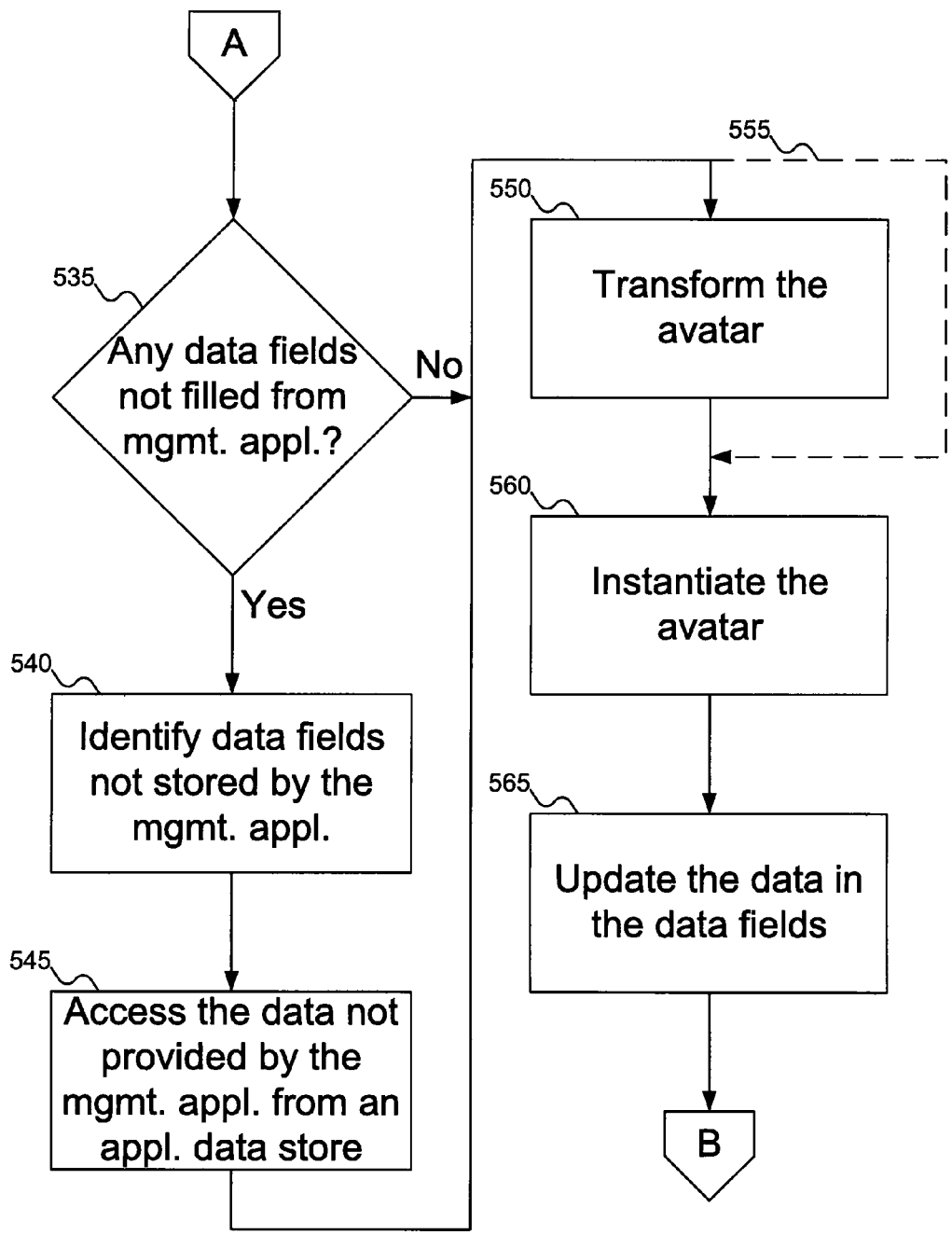
Figure 5C:
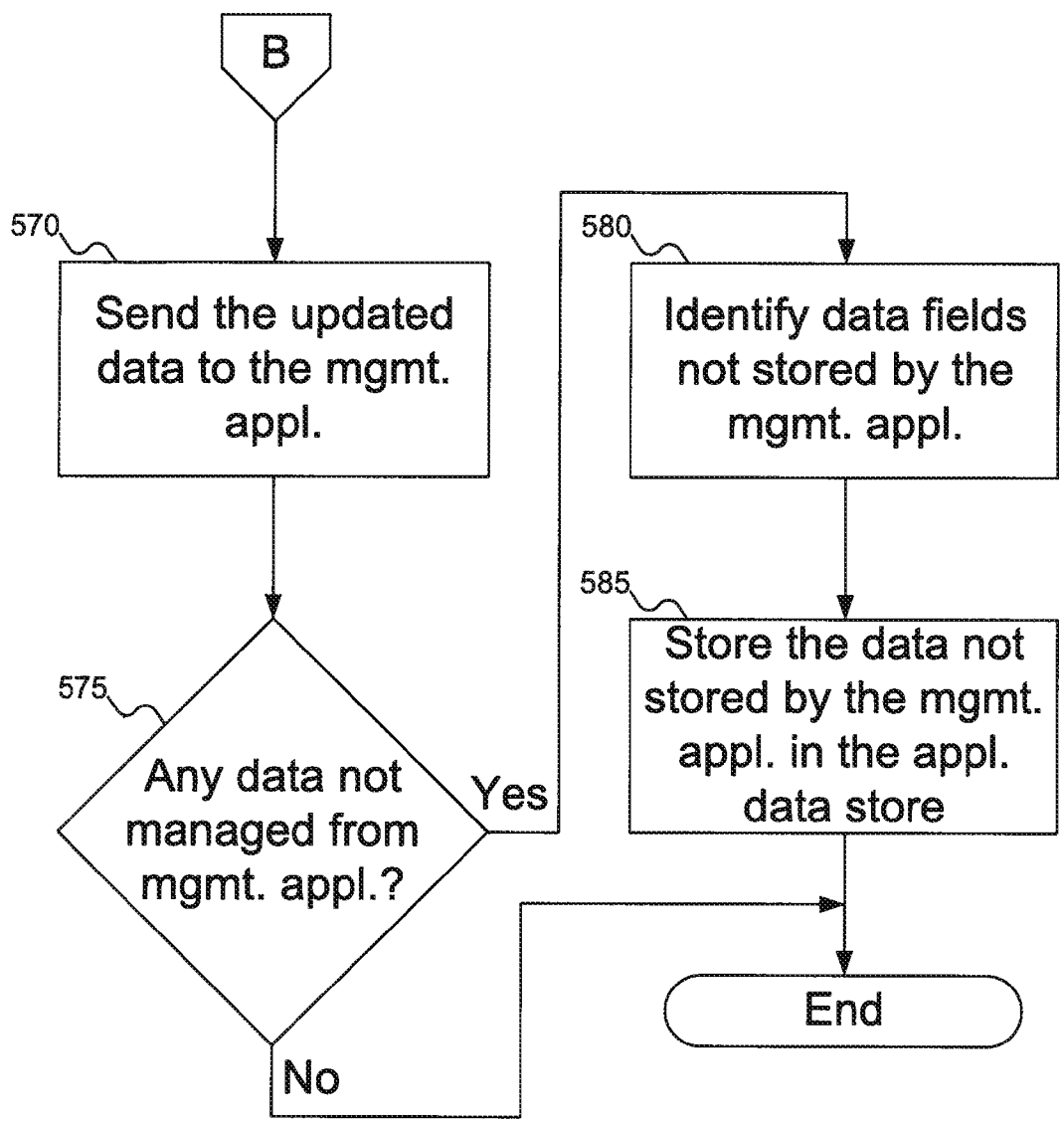

FIGS. 5A-5C show a procedure for using an application to instantiate an avatar received from a management application in the system of FIG. 1, according to an embodiment of the invention. In FIG. 5A, at step 505, the application receives a request from a management application to immerse an avatar. At step 510, the application identifies the data fields it uses for avatars. At step 515, the application requests from the management application the data for the data fields. As shown by arrow 520, steps 510 and 515 can be omitted, if the management application can determine the data fields used by the application and their scaling from an independent source (e.g., the certifying organization). At step 525, the application receives from the management application the avatar data. At step 530, the application stores the data in the data fields.

At step 535 (FIG. 5B), the application checks to see if any data fields were not filled with data from the management application. If not, then at step 540, these data fields are identified, and at step 545, the application fills these data fields using data from the application-specific data store for the avatar (assuming the avatar had been immersed in the application before, and therefore had generated such data. If not, then the avatar fills these data fields with default values). At step 550, the application transforms the avatar. As discussed above, if the management application performs the transformation, then step 550 is can be omitted, as shown by arrow 555. At step 560, the application instantiates the avatar, and at step 565, the application updates the data in the data fields as the avatar gains experience.

At step 570 (FIG. 5C), the application sends updated data back to the management application. At step 575, the application checks to see if there is any avatar data that the management application will not manage. If so, then at step 580, the application identifies these fields, and at step 585, the application stores the data from these fields in the application-specific data store.

While the above description focuses on the use of avatars in gaming applications, a person skilled in the art will recognize that other environments can be used for the avatars. For example, the applications can be "stores" in a shopping mall. Properties of the avatars can include information about monetary sources (such as bank names and routing numbers, account numbers, authorized users, etc.) and places to which purchases should be delivered (such as home or business address and contact persons). The avatar can be immersed in a particular store to make purchase, with the result that a purchase in the real world is affected.

For example, the avatar can be immersed in an application representing a pizza parlor. The user, through the avatar, can view the ordering options and place an order. The store would get from the avatar the address to which the order should be delivered. The user would authorize via the avatar the payment for the order, and the pizza parlor would then instruct a local franchise to deliver the order to the user.

Another possible use for avatars includes medical services. The avatar can include information about the person's medical history: e.g., recent illnesses, surgical history, medicine allergies, current prescriptions, etc. Emergency personnel can then use the avatar to learn the user's current state and recent history, to better diagnose and treat the problem. The avatar can receive information from any medical connections to the user: for example, if the user is connected to a sphygmomanometer, the avatar can store the user's current blood pressure as it is measured. (The avatar can theoretically receive information from wearable devices, and is not limited to receiving data from emergency equipment. For example, if the user is wearing a heart rate monitor, the avatar can receive data about the user's heart rate.)

As a more detailed example of how the avatar can be used for medical services, consider the following. A person wears, for example, a heart rate monitor, which tracks the person's heart rate. Provided the heart rate monitor has an appropriate software component, the heart rate monitor can be an application into which the avatar can be immersed. A connection can be maintained between the management application and the avatar, even while the avatar is immersed in the heart rate monitor. This connection can be used to transmit data from the avatar back to the management application. (This transmission can be continuous, or the data can be sent in bursts, as desired.)

In the event that a problem arises (e.g., the person's heart begins to fibrillate), the management application can take action on behalf of the person. The management application can detect the problem in several ways. For example, the heart rate monitor can transmit a specific signal indicating a problem, or the management application can recognize the current heart pattern as indicating fibrillation. Either way, the management application can act on the person's behalf: e.g., to alert emergency services. For example, the management application can immerse an avatar (either the same avatar immersed in the heart rate monitor or another avatar) in an application for the local emergency response, providing the person's location and current physical state to the emergency providers. (Note that this can result in the avatar being immersed simultaneously in multiple applications.) The management application can then act as a conduit between the two avatars, keeping the emergency response personnel informed about the person's condition. A person skilled in the art will recognize other ways in which the management application can respond to the problem on behalf of the person.

Yet another use for avatars would be to engage in stock transactions. The avatar can store data about the user's preferences (e.g., risk aversion, stocks of personal interest and personal dislike, investment limits, etc.) and can interact with brokerage applications to find ways to improve the user's portfolio. For example, the avatar can be informed about various stock buy and sell price limits for the user. The avatar can then be immersed in an application to monitor stock prices. When a stock's price reaches a buy or sell limit, the avatar can initiate a purchase or sell order on behalf of the user. If the avatar is not immersed in the user's brokerage application, the avatar can first be immersed in the brokerage application, and then the order can be initiated. (Note that the avatar might be left in the original application to continue to track stock prices, even while immersed in the brokerage application.) The user can then authorize or reject the transaction.

As can be seen from the above discussion, avatars can interact with applications in ways paralleling virtually any interaction a person can have with others. While specific applications have been discussed above, the use of avatars is not intended to be limited to only the disclosed applications. A person skilled in the art will recognize how other applications can be modified to use immersible avatars in a manner similar to that described above.

The above discussion focuses on using the avatar to achieve a result for the user in the real world (e.g., to order a pizza on behalf of a user, or execute a stock transaction on behalf of a user), or to store information about the user (e.g., medical history). But an avatar can also store intangible information about the user. For example, as discussed above, an avatar can store attributes such as intelligence, charisma, strength, wisdom, etc. These attributes, along with skills and other intangible characteristics, can also represent real world information about a user.

As an example, a user might have real world experience in using a bow and arrow. This can translate into advanced skill status with, say, a rifle in a game that uses more modern weaponry. Or, the user's proficiency might translate into increased accuracy in using a weapon during the game.

Appropriate use of real world data is important. One of the roles of the certifying organization can be to identify and enforce appropriate use of real world information. A person of ordinary skill in the art will recognize that real world data should only be altered in an application when it is appropriate for that application to do so.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "in one embodiment" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A computer including an application, comprising:
   a receiver to receive a request for at least one data field used by the application and to receive data for said at least one data field from a management application, said management application capable of immersing said avatar into at least the application and a second application offering different functionality;
   a transmitter to transmit said at least one data field to said management application, wherein said at least one data field do not include at least a second data field for which said management application stores data for said avatar;
   an avatar instantiator to instantiate said avatar using said received data;
   a data store to store data for said avatar unique to the application and not needed by any other application into which said management application can immerse said avatar; and
   wherein the transmitter is operative to transmit updated data for said at least one data field to said management application, after which said avatar is capable of being immersed in either the application or said second application, and
   said at least one data field stores data according to a standard set by a certifying organization.

2. A computer according to claim 1, further comprising a transformer to transform said avatar to a form consistent with the application.

3. A computer according to claim 1, wherein the transmitter is operative to transmit how to scale said at least one data field.

4. A computer according to claim 1, wherein the avatar instantiator is operative to instantiate said avatar without modifying said received data.

5. A computer according to claim 1, wherein said application conforms to standards set by the certifying organization.

6. A computer according to claim 1, wherein said at least one data field stores real world data about a user.

7. A computer according to claim 6, wherein said real world data stores information about a characteristic of said user.

8. A computer according to claim 1, further comprising a second computer including the management application.

9. A computer according to claim 1, wherein said certifying organization is a third-party entity separate from said management application and the application.

10. A computer-implemented method for an application to immerse an avatar, comprising:
    receiving a request from a management application to immerse the avatar in the application, the management application capable of immersing an avatar into at least the application and a second application offering different functionality;
    identifying at least one data field the application uses for the avatar;
    sending a data request to the management application, the data request including the identified data field and not including a second data field the application does not use for the avatar;
    receiving data for the avatar;
    storing the data in the data fields;
    instantiating the avatar in the application;
    updating the data in the data fields; and
    sending the updated data to the management application, after which the avatar is capable of being immersed in either the application or the second application,
    wherein said identified data field stores data according to a standard set by a certifying organization.

11. A method according to claim 10, wherein storing the data includes transforming the avatar into a form consistent with the application.

12. A method according to claim 10, wherein:
    the method further comprises:
      identifying a first data field for which the management application does not store the data; and
      storing the data in the first data field for the avatar in a data store for the application; and
    sending the updating data includes sending the updated data other than the data in the first data field to the management application.

13. A method according to claim 10, wherein sending a data request includes sending scales to use in scaling at least the identified data field, wherein the scales conform to standards set by a certifying organization.

14. A method according to claim 10, wherein sending a data request includes obtaining the scales from the certifying organization to use in scaling at least the identified data field.

15. A method according to claim 10, wherein identifying at least one data field the application uses for the avatar includes identifying at least one data field storing real world data about a user that the application uses for the avatar.

16. A method according to claim 15, wherein identifying at least one data field storing real world data about a user that the application uses for the avatar includes identifying at least one data field storing information about a characteristic of said user that the application uses for the avatar.

17. A method according to claim 10, wherein receiving a request from a management application to immerse the avatar in the application includes receiving at a first computer the request from a second computer to immerse the avatar, where the first computer includes the application and the second computer includes the management application.

18. A computer-implemented method according to claim 10, wherein said certifying organization is a third-party entity separate from the management application and the application.

19. An article comprising:
    a non-transitory storage medium, said non-transitory storage medium having stored thereon instructions, that, when executed by a machine, result in:
      receiving a request from a management application to immerse the avatar in the application, the management application capable of immersing an avatar into at least the application and a second application offering different functionality;
      identifying at least one data field the application uses for the avatar;
      sending a data request to the management application, the data request including the identified data field and not including a second data field the application does not use for the avatar;

receiving data for the avatar;
storing the data in the data fields;
instantiating the avatar in the application;
updating the data in the data fields; and
sending the updated data to the management application, after which said avatar is capable of being immersed in either the application or said second application,
wherein said identified data field stores data according to a standard set by a certifying organization.

20. An article according to claim 19, wherein storing the data includes transforming the avatar into a form consistent with the application.

21. An article according to claim 19, wherein:
the non-transitory storage medium having stored thereon further instructions, that, when executed by the machine, result in:
identifying a first data field for which the management application does not store the data; and
storing the data in the first data field for the avatar in a data store for the application; and
sending the updating data includes sending the updated data other than the data in the first data field to the management application.

22. An article according to claim 19, wherein sending a data request includes sending scales to use in scaling at least the identified data field.

23. An article according to claim 19, wherein identifying at least one data field the application uses for the avatar includes identifying at least one data field storing real world data about a user that the application uses for the avatar.

24. An article according to claim 23, wherein identifying at least one data field storing real world data about a user that the application uses for the avatar includes identifying at least one data field storing information about a characteristic of said user that the application uses for the avatar.

25. An article according to claim 19, wherein receiving a request from a management application to immerse the avatar in the application includes receiving at a first computer the request from a second computer to immerse the avatar, where the first computer includes the application and the second computer includes the management application.

26. An article according to claim 19, wherein said certifying organization is a third-party entity separate from the management application and the application.

* * * * *